United States Patent
Nie et al.

(10) Patent No.: US 11,608,387 B2
(45) Date of Patent: Mar. 21, 2023

(54) HIGH-VISCOSITY LITHIUM CARBOXYMETHYL CELLULOSE AND PREPARATION METHOD THEREFOR AND APPLICATION THEREOF

(71) Applicant: Chongqing Lihong Fine Chemicals Co., Ltd, Chongqing (CN)

(72) Inventors: Zhenzhen Nie, Chongqing (CN); Yinfeng Xia, Chongqing (CN); Youqi Li, Chongqing (CN); Haitao Zhang, Chongqing (CN); Kun Du, Chongqing (CN); Qing Yu, Chongqing (CN); Zilai Zhou, Chongqing (CN); Wei Liu, Chongqing (CN); Yuming He, Chongqing (CN); Jing Zhang, Chongqing (CN)

(73) Assignee: Chongqing Lihong Fine Chemicals Co., Ltd, Chongqing (CN)

( * ) Notice: Subject to any disclaimer, the term of this patent is extended or adjusted under 35 U.S.C. 154(b) by 0 days.

(21) Appl. No.: 17/681,971

(22) Filed: Feb. 28, 2022

(65) Prior Publication Data
US 2023/0002511 A1    Jan. 5, 2023

(30) Foreign Application Priority Data
Jul. 2, 2021 (CN) .......................... 202110753054.5

(51) Int. Cl.
| | |
|---|---|
| C08B 15/05 | (2006.01) |
| C08B 11/20 | (2006.01) |
| C08B 17/06 | (2006.01) |
| C08B 1/06 | (2006.01) |
| C08B 11/12 | (2006.01) |
| H01M 4/04 | (2006.01) |
| H01M 4/139 | (2010.01) |
| H01M 4/62 | (2006.01) |
| H01M 4/66 | (2006.01) |
| H01M 4/60 | (2006.01) |
| H01M 4/02 | (2006.01) |

(52) U.S. Cl.
CPC ................ *C08B 15/05* (2013.01); *C08B 1/06* (2013.01); *C08B 11/12* (2013.01); *C08B 11/20* (2013.01); *C08B 17/06* (2013.01); *H01M 4/0404* (2013.01); *H01M 4/0435* (2013.01); *H01M 4/139* (2013.01); *H01M 4/608* (2013.01); *H01M 4/625* (2013.01); *H01M 4/661* (2013.01); *H01M 2004/027* (2013.01)

(58) Field of Classification Search
None
See application file for complete search history.

(56) References Cited

FOREIGN PATENT DOCUMENTS

| | | | | |
|---|---|---|---|---|
| CN | 102206286 | * | 10/2011 | ............ Y02E 60/10 |
| CN | 105330751 | * | 2/2016 | ............ C08B 11/12 |

OTHER PUBLICATIONS

English machine translation of CN105330751 above, downloaded from worldwide.espacenet.com (Year: 2016).*
English machine translation of CN102206286 above, downloaded from worldwide.espacenet.com (Year: 2011).*
Qiu et al., "High Performance Study of Lithium Carboxymethylcellulose as Water-Soluble Binder for Lithium Supplementation in Lithium Batteries" Starch—Starke vol. 74 DOI: 10.1002/star.202200049 (Year: 2022).*

* cited by examiner

Primary Examiner — Eric Olson

(57) ABSTRACT

The present application belongs to a technical field of modifying natural polymer materials, provides a high-viscosity lithium carboxymethyl cellulose and preparation method therefor and application thereof. Raw materials are fed into a reactor, and the high-viscosity lithium carboxymethyl cellulose is prepared through an alkalization reaction, an etherification reaction, an acidification reaction and a substitution reaction. The prepared high-viscosity lithium carboxymethyl cellulose can be used for preparing a negative electrode plate of a lithium-ion battery. Compared with the existing lithium carboxymethyl cellulose, the high-viscosity lithium carboxymethyl cellulose provided by the present application can not only reduce an application amount in preparing a negative electrode plate of a lithium-ion battery so as to save a using cost, but also promote an electrochemical performance of the material in combination with a sodium lignin sulfonate.

1 Claim, No Drawings

HIGH-VISCOSITY LITHIUM CARBOXYMETHYL CELLULOSE AND PREPARATION METHOD THEREFOR AND APPLICATION THEREOF

CROSS-REFERENCE TO RELATED APPLICATION

This application claims the priority of Chinese Patent Application No. 202110753054.5 filed on Jul. 2, 2021, the contents of which are hereby incorporated by reference in their entirety.

TECHNICAL FIELD

The present application relates to a technical field of modifying natural polymer materials, particularly a high-viscosity lithium carboxymethyl cellulose and preparation method therefor and application thereof.

BACKGROUND

With a rapid development of products of 3C and new energy power, they have higher requirements for an energy density and an electrochemical performance of a lithium-ion battery. There are two directions to increase the energy density, one of which is to develop active materials with high energy density such as high-nickel material, silicon-carbon material, and silicon-oxide material; the other of which is to reduce an application amount of additives in a slurry system, so as to increase an addition amount of the active materials, for example, by using a conductive agent with high conductivity, an adhesive with high viscosity, a dispersant having good dispersing performance and the like.

Lithium carboxymethyl cellulose plays roles of stabilizing a slurry, dispersing active substances and assisting adhering in a preparation of the slurry of a negative electrode plate of a lithium-ion battery. However, the lithium carboxymethyl cellulose belongs to a polymer material having poorer conductive performance, which may inhibit an exhibition of the electrochemical performance of the active substances while coated on the active substances. Furthermore, the viscosity of the existing lithium carboxymethyl cellulose is limited, therefore the addition amount is larger, usually 1.0% to 1.5%, which further increases the production cost, moreover, a performance in carboxymethyl cellulose still has much space for promotion.

SUMMARY

In view of this, the present application provides a lithium carboxymethyl cellulose with high viscosity, which can reduce an application amount of the lithium carboxymethyl cellulose in preparing a negative electrode plate of a lithium-ion battery, and can promote an energy density and an electrochemical performance of the lithium-ion battery.

In order to achieve the above-described object, the present application firstly provides a preparation method for a high-viscosity lithium carboxymethyl cellulose, comprising the following steps:

mixing a cellulose, a cross-linking agent, and a sodium hydroxide solution in an ethanol solution, filling with nitrogen gas to form an inert atmosphere after vacuumizing to remove air, performing an alkalization reaction under the inert atmosphere, subjecting a reaction product to an etherification under normal pressure to obtain a crude CMC-Na; acidifying the crude CMC-Na to obtain a CMC-H; and adding the prepared CMC-H into a lithium salt-ethanol solution to perform a substitution reaction, to obtain the high-viscosity lithium carboxymethyl cellulose.

Further, the cross-linking agent is an aqueous solution of a polar solvent; furthermore, a concentration of the cross-linking agent is 20% to 85%.

Further, a volume concentration of the ethanol solution in the alkalization reaction is 70% to 95%.

Further, a concentration of the sodium hydroxide solution is 25% to 50%.

Further, raw materials are put into a reactor in accordance with the stated parts by weight; and the reactor is vacuumized to −10 to −25 KPa for the first time, then filled with nitrogen to 3 to 10 KPa, vacuumized to −25 to −80 KPa for the second time, and filled with nitrogen to 3 to 10 KPa again, to perform an alkalization reaction.

Further, a pressure of the nitrogen gas is maintained at 3 to 10 KPa during the reaction, and a time for the alkalization reaction is 30 to 70 min.

Further, a product of the alkalization reaction is added into a monochloro acetic acid-ethanol solution to perform an etherification reaction under normal pressure; furthermore, a mass concentration of the monochloro acetic acid in the monochloro acetic acid-ethanol solution is 45% to 65%, and a volume concentration of the ethanol in the monochloro acetic acid-ethanol solution ≥93%.

Further, a time for the etherification reaction is 30 to 80 min.

Further, the crude CMC-Na is added into a sulfuric acid solution to perform the acidification reaction in a normal-pressure system; furthermore, a concentration of the sulfuric acid solution is 10% to 40%.

Further, a time for the acidification reaction is 60 to 180 min.

Further, the lithium salt-ethanol solution is prepared by dissolving 0.5 to 3 parts of the lithium salt in 1 to 5 parts of the ethanol solution with a concentration of 65% to 95%, in terms of parts by weight.

Further, a time for the substitution reaction is 30 to 120 min.

Further, adding amounts of the cellulose, the cross-linking agent, the sodium hydroxide solution, the ethanol solution, and the monochloro acetic acid-ethanol solution are respectively 3 to 10 parts, 2 to 15 parts, 1 to 8 parts, 5 to 25 parts and 2 to 10 parts, in terms of parts by weight.

Secondly, the present application provides a high-viscosity lithium carboxymethyl cellulose prepared by the above-described preparation method for the high-viscosity lithium carboxymethyl cellulose.

Thirdly, the present application provides an application of the high-viscosity lithium carboxymethyl cellulose in preparing a negative electrode plate of a lithium-ion battery.

Specifically, this application comprises the following steps:

adding the high-viscosity lithium carboxymethyl cellulose into water, stirring for 2 to 4 h, adding a sodium lignin sulfonate, a single-wall carbon nanotube, and a graphene during mixing, dissolving the high-viscosity lithium carboxymethyl cellulose and the sodium lignin sulfonate, then standing still the solution for 6 to 24 h, mixing a graphite with a conductive carbon black, then adding the graphite and the conductive carbon black into the solution, dispersing for 1 to 3 h at a rotational speed of 850 to 1500 rpm, reducing the rotational speed to 200 to 500 rpm after finishing the dispersing, adding a styrene butadiene latex, and continuing to stir for 0.5 to 1 h to obtain a slurry; after adjusting a viscosity of the slurry to 3000 to 7000 mPa·s, coating the slurry onto a copper foil as a current collector of a negative electrode, drying, and roller pressing to obtain the negative electrode plate.

Further, the following raw materials are comprised in terms of parts by weight:

the graphite 96 to 98 parts, the conductive carbon black 1 to 2 parts, the lithium carboxymethyl cellulose 0.6 to 1 parts, the styrene butadiene latex 1 to 2 parts, the sodium lignin sulfonate 0.1 to 0.5 parts, the single-wall carbon nanotube 0 to 0.5 parts, the graphene 0 to 0.5 parts and water 20 to 70 parts.

The present application has the following beneficial effects:

(1) The high-viscosity lithium carboxymethyl cellulose provided by the present application, as an additive of a negative electrode plate, may reduce an application amount to 0.6%, can reduce by 0.4% or more compared with that of 1.0 to 1.5% in the prior art, saving a production cost.

(2) The high-viscosity lithium carboxymethyl cellulose provided by the present application may also increase the energy density and a transferring velocity of lithium ions in the battery, so that a direct current resistance of the lithium battery while discharging at −30° C. reduces by 18% more or less. A capacity at a high rate may increase by 15% more or less, showing that the lithium battery has excellent electrochemical performance.

(3) A use of the combination of the sodium lignin sulfonate with the high-viscosity lithium carboxymethyl cellulose can further disperse the single-wall carbon nanotube and the graphene to increase a conductivity of the electrode plate, increasing a dynamics performance of the battery.

DETAILED DESCRIPTION OF EMBODIMENTS

A preparation method for a high-viscosity lithium carboxymethyl cellulose, comprises the following steps:

mixing a cellulose, a cross-linking agent, and a sodium hydroxide solution in an ethanol solution, filling with nitrogen gas to form an inert atmosphere after vacuumizing to remove air, performing an alkalization reaction under the inert atmosphere, subjecting a reaction product to an etherification under normal pressure to obtain a crude CMC-Na; acidifying the crude CMC-Na to obtain a CMC-H; adding the prepared CMC-H into a lithium salt-ethanol solution to perform a substitution reaction, to obtain the high-viscosity lithium carboxymethyl cellulose.

Further, the cross-linking agent is an aqueous solution of a polar solvent; furthermore, a concentration of the cross-linking agent is 20% to 85%.

The present application has no limit to the type of the cross-linking agent, as long as it meets the condition of being a polar solvent, and the cross-linking agent may be methanol, ethanol or isopropanol.

Further, a volume concentration of the ethanol solution in the alkalization reaction is 70% to 95%.

Further, a concentration of the sodium hydroxide solution is 25% to 50%.

Further, raw materials in accordance with the stated parts by weight are put into a reactor; and the reactor is vacuumized to −10 to −25 KPa for the first time, then filled with nitrogen to 3 to 10 KPa, vacuumized to −25 to −80 KPa for the second time, and filled with nitrogen to 3 to 10 KPa again, to perform an alkalization reaction.

A purpose for vacuumizing is to eliminate air for avoiding oxygen in the air from oxidizing the cellulose, which results in a molecular chain getting shortened to reduce viscosity.

After vacuumizing, filling with nitrogen to form an inert atmosphere is to prevent air from entering the reactor again. Repeatedly vacuumizing-filling with nitrogen operations are both to secure the reactor to be an environment free of air and free of oxygen. Finally, the whole process of the alkalization reaction requires that a pressure of nitrogen gas is maintained at 3 to 10 KPa, which is a slightly barotropic state fully filled with the inert gas, and its purpose is to prevent air from entering the reactor, so as to not carry in oxygen.

Further, a time for the alkalization reaction is 30 to 70 min.

Further, a product of the alkalization reaction is added into a monochloro acetic acid-ethanol solution to perform an etherification reaction under normal pressure; furthermore, a mass concentration of the monochloro acetic acid in the monochloro acetic acid-ethanol solution is 45% to 65%, and a volume concentration of the ethanol in the monochloro acetic acid-ethanol solution ≥93%.

Further, a time for the etherification reaction is 30 to 80 min.

Further, after finishing the etherification reaction, a reaction product is washed using an ethanol solution, and purified by a centrifugal separation; furthermore, a volume concentration of the ethanol solution used during the purification is 50 to 80%, and a number of times for washing is 3 to 4 times.

Further, the crude CMC-Na is added into a sulfuric acid solution to perform an acidification reaction in a normal-pressure system; furthermore, a concentration of the sulfuric acid solution is 10% to 40%.

Further, a time for the acidification reaction is 60 to 180 min.

Further, the lithium salt-ethanol solution is prepared by dissolving 0.5 to 3 parts of the lithium salt in 1 to 5 parts of the ethanol solution with a concentration of 65% to 95%, in terms of parts by weight; furthermore, the lithium salt may be lithium acetate.

Furthermore, the lithium salt may also be lithium hydroxide or lithium carbonate. When lithium hydroxide or lithium carbonate is selected, water is added into 0.5 to 3 parts of the lithium hydroxide or the lithium carbonate in terms of parts by weight until the lithium salt is dissolved. After finishing the dissolution, the solution is mixed with 1 to 5 parts by weight of the ethanol solution with a concentration of 65% to 95% to obtain the lithium salt-ethanol solution.

Further, a time for the substitution reaction is 30 to 120 min.

Further, adding amounts of the cellulose, the cross-linking agent, the sodium hydroxide solution, the ethanol solution, and the monochloro acetic acid-ethanol solution are respectively 3 to 10 parts, 2 to 15 parts, 1 to 8 parts, 5 to 25 parts and 2 to 10 parts, in terms of parts by weight.

Secondly, the present application provides a high-viscosity lithium carboxymethyl cellulose prepared by the above-described preparation method for the high-viscosity lithium carboxymethyl cellulose.

After detecting, the high-viscosity lithium carboxymethyl cellulose provided by the present application has the following physical and chemical properties:

degree of substitution: 0.6 to 1.0;
1% viscosity: >25000 mPa·s;
pH: 6.5 to 9.5; and
purity ≥99.7%.

The present application provides an application of the high-viscosity lithium carboxymethyl cellulose in preparing a negative electrode plate of a lithium-ion battery.

Specifically, this application comprises the following steps:

adding the high-viscosity lithium carboxymethyl cellulose into water and stirring for 2 to 4 h, adding a sodium lignin sulfonate, a single-wall carbon nanotube, and a graphene during mixing, after the high-viscosity lithium carboxymethyl cellulose and the sodium lignin sulfonate are dissolved, standing still the solution for 6 to 24 h, after mixing a graphite with a conductive carbon black, adding the graphite and the conductive carbon black into the solution, dispersing for 1 to 3 h under a rotational speed of 850 to 1500 rpm, reducing the rotational speed to 200 to 500 rpm after finishing the dispersing and adding a styrene butadiene latex, continuing to stir for 0.5 to 1 h to obtain a slurry; after adjusting a viscosity of the slurry to 3000 to 7000 mPa·s, coating the slurry onto a copper foil as a current collector of a negative electrode, drying, and roller pressing to obtain the negative electrode plate.

Further, the following raw materials are comprised in terms of parts by weight:

the graphite 96 to 98 parts, the conductive carbon black 1 to 2 parts, the lithium carboxymethyl cellulose 0.6 to 1 parts, the styrene butadiene latex 1 to 2 parts, the sodium lignin sulfonate 0.1 to 0.5 parts, the single-wall carbon nanotube 0 to 0.5 parts, the graphene 0 to 0.5 parts and water 20 to 70 parts.

Technical solutions in Examples of the present application will be described clearly and completely below. Obviously, the described Examples are only a part of Examples of the present application, and are not all Examples. Based on Examples in the present application, all other Examples obtained by an ordinary person skilled in this field on the premise of without doing creative work, all belong to the protection scope of the present application.

Example 1

A lithium carboxymethyl cellulose with high viscosity was prepared by the following steps:

(1) 3 parts by weight of a cellulose, 2 parts by weight of a methanol aqueous solution with a concentration of 20%, 1 part by weight of a sodium hydroxide solution with a concentration of 25% and 5 parts by weight of an ethanol solution with a concentration of 70% were added into a reactor; and the reactor was vacuumized to −20 KPa for the first time, filled with nitrogen to 3 KPa, vacuumized to −25 KPa for the second time, and filled with nitrogen to 3 KPa, to perform an alkalization reaction. A pressure of nitrogen gas during the alkalization reaction was maintained at 3 KPa, and a time for the alkalization reaction was 30 min.

(2) A product of the alkalization reaction was added into 2 parts by weight of a monochloro acetic acid-ethanol solution with a mass concentration of the monochloro acetic acid of 45% and a volume concentration the ethanol of 93%, the pressure was increased to normal pressure to perform an etherification reaction, a time for the etherification reaction was 30 min, and a product of the etherification reaction was washed for 3 times using an ethanol with a concentration of 50% to obtain a crude CMC-Na.

(3) The crude CMC-Na was added into 10% of a sulfuric acid solution, an acidification reaction was performed under normal pressure to obtain a CMC-H, and a time for the acidification reaction was 60 min.

(4) 0.5 parts by weight of lithium acetate were dissolved in 1 part by weight an ethanol solution with a concentration of 65% to prepare a lithium salt-ethanol solution, the CMC-H was added into the lithium salt-ethanol solution to perform a substitution reaction, pH of the substitution reaction was controlled to 6.5, and a time for the substitution reaction was 30 min, to obtain the high-viscosity lithium carboxymethyl cellulose.

Physical and chemical performances of the prepared high-viscosity lithium carboxymethyl cellulose were detected, and results are as follows:
degree of substitution: 0.65;
1% viscosity: 27580 mPa·s;
pH: 6.9; and
purity: 99.82%.

Example 2

A lithium carboxymethyl cellulose with high viscosity was prepared by the following steps:

(1) 10 parts by weight of a cellulose, 15 parts by weight of an isopropanol aqueous solution with a concentration of 85%, 8 parts by weight of a sodium hydroxide solution with a concentration of 50% and 25 parts by weight of an ethanol solution with a concentration of 95% were added into a reactor; and the reactor was vacuumized to −20 KPa for the first time, filled with nitrogen to 10 KPa, vacuumized to −80 KPa for the second time, and filled with nitrogen to 10 KPa, to perform an alkalization reaction. A pressure of nitrogen gas during the alkalization reaction was maintained at 10 KPa, and a time for the alkalization reaction was 70 min.

(2) A product of the alkalization reaction was added into 10 parts by weight of in a monochloro acetic acid-ethanol solution with a mass concentration of the monochloro acetic acid of 65% and a volume concentration of the ethanol of 95%, the pressure was increased to normal pressure to perform an etherification reaction, a time for the etherification reaction was 80 min, and a product of the etherification reaction was washed for 3 times using an ethanol with a concentration of 50% to obtain a crude CMC-Na.

(3) The crude CMC-Na was added into 40% of a sulfuric acid solution, an acidification reaction was performed under normal pressure to obtain a CMC-H, and a time for the acidification reaction was 180 min.

(4) A lithium salt-ethanol solution was prepared by dissolving 3 parts by weight of lithium acetate in 5 parts by weight of an ethanol solution with a concentration of 95%, the CMC-H was added into the lithium salt-ethanol solution to perform a substitution reaction, pH of the substitution reaction was controlled to 9.5, and a time for the substitution reaction was 120 min, to obtain the high-viscosity lithium carboxymethyl cellulose.

Physical and chemical performances of the prepared high-viscosity lithium carboxymethyl cellulose were detected, and results are as follows:
degree of substitution: 0.70;
1% viscosity: 30180 mPa·s;
pH: 8.0; and
purity: 99.97%.

Example 3

A lithium carboxymethyl cellulose with high viscosity was prepared by the following steps:

(1) 5 parts by weight of a cellulose, 7 parts by weight of an isopropanol aqueous solution with a concentration of 45%, 5 parts by weight of a sodium hydroxide solution with a concentration of 40% and 15 parts by weight of an ethanol solution with a concentration of 80% were added into a reactor; and the reactor was vacuumized to −20 KPa for the first time, filled with nitrogen to 8 KPa, vacuumized to −50

KPa for the second time, and filled with nitrogen to 8 KPa, to perform an alkalization reaction. A pressure of nitrogen gas during the alkalization reaction is maintained at 8 KPa, and a time for the alkalization reaction was 50 min.

(2) A product of the alkalization reaction was added into 6 parts by weight of an monochloro acetic acid-ethanol solution with a mass concentration of the monochloro acetic acid of 50% and a volume concentration of the ethanol of 93%, the pressure was increased to normal pressure to perform an etherification reaction, a time for the etherification reaction was 50 min, and a product of the etherification reaction was washed for 3 times using an ethanol with a concentration of 50% to obtain a crude CMC-Na.

(3) The crude CMC-Na was added into 20% of a sulfuric acid solution, an acidification reaction was performed under normal pressure to obtain a CMC-H, and a time for the acidification reaction was 120 min.

(4) A lithium salt-ethanol solution was prepared by dissolving 2 parts by weight of lithium acetate in 4 parts by weight of an ethanol solution with a concentration of 75%, the CMC-H was added into the lithium salt-ethanol solution to perform a substitution reaction, pH of the substitution reaction was controlled to 8.0, and a time for the substitution reaction was 90 min, to obtain the high-viscosity lithium carboxymethyl cellulose Physical and chemical performances of the prepared high-viscosity lithium carboxymethyl cellulose were detected, and results are as follows:

degree of substitution: 0.69;
1% viscosity: 32905 mPa·s;
pH: 7.8; and
purity: 99.9%.

Example 4

A preparation method for a negative electrode plate of a lithium-ion battery comprises the following steps:

(1) In terms of parts by weight, 96 parts of a graphite, 1 part of a conductive carbon black, 0.9 parts of the high-viscosity lithium carboxymethyl cellulose prepared in Example 3, 2 parts by weight of a styrene-butadiene latex, 0.1 parts by weight of a sodium lignin sulfonate, and 20 parts by weight of a deionized water were weighed.

(2) The high-viscosity lithium carboxymethyl cellulose prepared in Example 3 was mixed with the deionized water, the sodium lignin sulfonate was added during mixing, and the solution was stood still for 12 h after the high-viscosity lithium carboxymethyl cellulose and the sodium lignin sulfonate were dissolved.

(3) The solution in the step (2) was added after uniformly mixing the graphite and the conductive carbon black, and high-speed dispersing was performed under 850 rpm for 3 h.

(4) After finishing the high-speed dispersing, the rotational speed was reduced to 200 rpm, the styrene-butadiene latex was added, and stirring was continued for 1 h to obtain a slurry.

(5) A viscosity of the slurry was adjusted to 4986 mPa·s, and a solid content of the slurry was 48.3%.

(6) The slurry was used for coating on a copper foil as a current collector of a negative electrode, and drying and roller pressing were performed to obtain the negative electrode plate.

Example 5

A preparation method for a negative electrode plate of a lithium-ion battery comprises the following steps:

(1) In terms of parts by weight, 98 parts by weight of a graphite, 2 parts by weight of a conductive carbon black, 0.5 parts by weight of a single-wall carbon nanotube, 1 part of the high-viscosity lithium carboxymethyl cellulose prepared in Example 3, 1 part by weight of a styrene-butadiene latex, 0.5 parts of a sodium lignin sulfonate, and 70 parts of a deionized water were weighed.

(2) The high-viscosity lithium carboxymethyl cellulose prepared in Example 3 was mixed with the deionized water, the sodium lignin sulfonate and single-wall carbon nanotube were added during mixing, and the solution was stood still for 8 h after the high-viscosity lithium carboxymethyl cellulose and the sodium lignin sulfonate were dissolved.

(3) The solution in the step (2) was added after uniformly mixing the graphite and the conductive carbon black, and high-speed dispersing was performed under 1500 rpm for 1 h.

(4) After finishing the high-speed dispersing, the rotational speed was reduced to 500 rpm, the styrene-butadiene latex was added, and stirring was continued for 0.5 h to obtain a slurry.

(5) A viscosity of the slurry was adjusted to 4830 mPa·s, and a solid content of the slurry was 48.0%.

(6) The slurry was coated on a copper foil as a current collector of a negative electrode, and drying and roller pressing were performed to obtain the negative electrode plate.

Example 6

A preparation method for a negative electrode plate of a lithium-ion battery comprises the following steps:

(1) In terms of parts by weight, 96 parts of a graphite, 0.5 parts of a conductive carbon black, 0.5 parts of a graphene, 0.6 parts of the high-viscosity lithium carboxymethyl cellulose prepared in Example 3, 2 parts by weight of a styrene-butadiene latex, 0.4 parts of a sodium lignin sulfonate, and 50 parts of a deionized water were weighed.

(2) The high-viscosity lithium carboxymethyl cellulose prepared in Example 3 was mixed with the deionized water, the sodium lignin sulfonate and the graphene were added during mixing, and the solution was stood still for 12 h after the high-viscosity lithium carboxymethyl cellulose and the sodium lignin sulfonate were dissolved.

(3) The solution in the step (2) was added after uniformly mixing the graphite and the conductive carbon black, and high-speed dispersing was performed under 1000 rpm for 2 h.

(4) After finishing the high-speed dispersing, the rotational speed was reduced to 300 rpm, the styrene-butadiene latex was added, and stirring was continued for 0.5 h to obtain a slurry.

(5) A viscosity of the slurry was adjusted to 4880 mPa·s, and a solid content of the slurry was 48.73%.

(6) The slurry was coated on a copper foil as a current collector of a negative electrode, and drying and roller pressing were performed to obtain the negative electrode plate.

Comparative Example

A preparation method for a negative electrode plate of a lithium-ion battery comprises the following steps:

(1) In terms of parts by weight, 95.5 parts of a graphite, 1 part of a conductive carbon black, 1.5 parts of a commercially available lithium carboxymethyl cellulose, 2 parts by weight of a styrene-butadiene latex, and 50 parts of a deionized water were weighed. Wherein, a degree of substitution for the commercially available lithium carboxymethyl cellulose was 0.68, 1% viscosity was 4950 mPa·s, and pH was 7.6.

(2) A lithium carboxymethyl cellulose was mixed with a deionized water, and the solution was stood for 12 h after the lithium carboxymethyl cellulose was dissolved.

(3) The solution in the step (2) was added after uniformly mixing the graphite and the conductive carbon black, and high-speed dispersing was performed under 850 rpm for 3 h.

(4) After finishing the high-speed dispersing, the rotational speed was reduced to 200 rpm, the styrene-butadiene latex was added, and stirring was continued for 1 h to obtain a slurry.

(5) A viscosity of the slurry was adjusted to 4770 mPa·s, and a solid content of the slurry was 47.9%.

(6) The slurry was coated on a copper foil as a current collector of a negative electrode, and drying and roller pressing were performed to obtain the negative electrode plate.

The negative electrode plates of the lithium-ion battery prepared in Examples 4 to 6 and Comparative Example were respectively equipped with a positive electrode plate of a lithium iron phosphate system, and winded into 500 mAh batteries. Electrochemical performances were tested, and results for the performance tests are shown in Tables 1 to 5.

TABLE 1

Results for tests of initial efficiency in Examples 4 to 6 and Comparative Example

|  | Initial Discharging Capacity (mAh) | Initial Efficiency (%) |
| --- | --- | --- |
| Example 4 | 437 | 87.4 |
|  | 436 | 87.2 |
|  | 439 | 87.8 |
| Example 5 | 438 | 87.6 |
|  | 440 | 88.0 |
|  | 435.5 | 87.1 |
| Example 6 | 442.5 | 88.5 |
|  | 440.5 | 88.1 |
|  | 442 | 88.4 |
| Comparative Example | 428.5 | 85.7 |
|  | 426.5 | 85.3 |
|  | 428 | 85.6 |

TABLE 2

Results for tests of normal-temperature DCR in Examples 4 to 6 and Comparative Example DCR(mΩ) 5C DC 30 s @ 25° C.

| State of Charges | 70% SOC | 50% SOC | 30% SOC |
| --- | --- | --- | --- |
|  | 173.51 | 167.42 | 172.96 |
| Example 4 | 174.25 | 166.87 | 173.12 |
|  | 174.69 | 167.03 | 172.76 |
|  | 168.86 | 160.02 | 165.83 |
| Example 5 | 167.43 | 159.46 | 166.41 |
|  | 169.23 | 159.20 | 165.79 |
| Example 6 | 160.72 | 153.48 | 158.65 |
|  | 162.38 | 154.25 | 159.06 |
|  | 161.59 | 154.10 | 159.24 |
| Comparative Example | 191.53 | 185.12 | 189.26 |
|  | 192.28 | 186.26 | 188.62 |
|  | 190.89 | 184.91 | 188.79 |

TABLE 3

Results for tests of low-temperature DCR in Examples 4 to 6 and Comparative Example DCR (mΩ) 5C DC 30 s @ −30° C.

| State of Charges | 70% SOC | 50% SOC | 30% SOC |
| --- | --- | --- | --- |
|  | 177.08 | 174.35 | 176.83 |
| Example 4 | 177.43 | 173.84 | 176.28 |
|  | 178.65 | 174.12 | 177.51 |
|  | 173.70 | 170.56 | 172.43 |
| Example 5 | 173.12 | 169.68 | 172.71 |
|  | 173.56 | 169.75 | 171.76 |
|  | 168.29 | 165.43 | 167.05 |
| Example 6 | 168.46 | 165.70 | 167.28 |
|  | 168.93 | 164.97 | 166.68 |
|  | 203.06 | 199.20 | 201.68 |
| Comparative Example | 203.19 | 198.49 | 201.26 |
|  | 203.36 | 199.87 | 201.09 |

TABLE 4

Results for tests of high-temperature and low-temperature performances in Examples 4 to 6 and Comparative Example High-temperature and Low-temperature Performances @ 1 C.

| Temperature (° C.) | −25 | −20 | 0 | 25 | 50 |
| --- | --- | --- | --- | --- | --- |
| Example 4 | 71.9% | 75.3% | 90.5% | 100% | 100.8% |
|  | 71.2% | 74.9% | 90.5% | 100% | 100.5% |
|  | 72.4% | 75.8% | 91.2% | 100% | 100.3% |
| Example 5 | 73.1% | 76.8% | 92.3% | 100% | 101.2% |
|  | 72.9% | 76.1% | 91.9% | 100% | 100.9% |
|  | 72.5% | 75.7% | 91.5% | 100% | 101.0% |
| Example 6 | 71.0% | 74.3% | 90.3% | 100% | 100.4% |
|  | 72.6% | 75.4% | 91.7% | 100% | 101.7% |
|  | 71.3% | 74.8% | 91.0% | 100% | 100.3% |
| Comparative Example | 68.7% | 72.5% | 88.1% | 100% | 100.3% |
|  | 68.0% | 72.7% | 88.6% | 100% | 100.8% |
|  | 67.9% | 72.2% | 88.0% | 100% | 100.1% |

TABLE 5

Results for tests of rate performances in Examples 4 to 6 and Comparative Example Charging ability in different rates @ 0.33 C.

| Rate | 0.33 C. | 0.5 C. | 1 C. | 2 C. | 3 C. |
| --- | --- | --- | --- | --- | --- |
| Example 4 | 100% | 92.3% | 77.3% | 65.3% | 53.8% |
|  | 100% | 92.7% | 78.0% | 65.7% | 54.0% |
|  | 100% | 93.1% | 76.1% | 65.1% | 53.2% |
| Example 5 | 100% | 93.5% | 77.6% | 66.4% | 55.7% |
|  | 100% | 92.6% | 77.5% | 65.9% | 55.0% |
|  | 100% | 93.0% | 78.3% | 66.9% | 55.6% |
| Example 6 | 100% | 93.7% | 77.8% | 66.3% | 55.4% |
|  | 100% | 94.0% | 78.1% | 67.2% | 55.7% |
|  | 100% | 93.1% | 77.3% | 66.6% | 55.1% |
| Comparative Example | 100% | 90.0% | 72.5% | 58.2% | 43.2% |
|  | 100% | 89.7% | 72.9% | 58.7% | 43.8% |
|  | 100% | 91.6% | 71.6% | 58.6% | 44% |

It can be seen from Table 1 that using the combination of the ultrahigh-viscocity lithium carboxymethyl cellulose with the sodium lignin sulfonate as a dispersing agent and a thickener of the negative electrode slurry system may reduce the addition amount by 0.5%, and increase the addition amount of active substances, thereby increasing the capacity and the initial efficiency of the battery.

It can be seen from Tables 2 to 5, the combination of the ultrahigh-viscocity lithium carboxymethyl cellulose with the sodium lignin sulfonate may disperse the single-wall carbon nanotube and the grapheme, and the combination of the conductive carbon black with the single-wall carbon nanotube or the graphene combines short-distance electric conducting with long-range electric conducting, which may increase the conductivity of the electrode plate, thereby increasing the dynamics performance of the battery. The normal-temperature DCRs are reduced by 9% to 16%, low-temperature DCRs are reduced by 13% to 17%, retention rates of the capacity at high temperature and low temperature are increased by 3% more or less, and the retention rates of the capacity at a high rate (3C) may increase by 10 to 12%.

Various Examples in this specification are described in a progressive manner, each Example emphasizes the description about the difference from other Examples, and the same or similar parts may be referenced mutually between various Examples.

The above-described description about the disclosed Examples enables a person skilled in the present field to realize or use the present application. Various modifications made to these Examples will be obvious for a person skilled in the present field, and a general principle defined herein may be realized in other Examples without departing from the spirit or the scope of the present application. Therefore, the present application will not be limited to these Examples shown herein, but rather confirm the broadest scope consistent with the principle and novel characters disclosed herein.

The invention claimed is:

1. A method for preparing a lithium carboxymethyl cellulose, comprising the following steps:
    a) mixing 3 to 10 parts by weight of cellulose, 2 to 15 parts by weight of an aqueous solution of a polar solvent, and 1 to 8 parts by weight of a sodium hydroxide solution in 5 to 25 parts by weight of an ethanol solution, wherein
    the aqueous solution of the polar solvent contains 20% to 85% by weight of methanol or isopropanol;
    the ethanol solution contains 70% to 95% by volume of ethanol; and
    the sodium hydroxide solution contains 25% to 50% by weight of sodium hydroxide;
    b) performing an alkalization reaction with the mixture obtained from step a) under an inert atmosphere, wherein the alkalization reaction is carried out by the following steps:
    putting the mixture obtained from step a) into a reactor, vacuumizing to −10 to −25 KPa for a first time, then filling with nitrogen to 3 to 10 KPa, vacuumizing to −25 to −80 KPa for a second time, filling with nitrogen to 3 to 10 KPa again, and performing the alkalization reaction under a pressure of nitrogen gas at 3 to 10 KPa for 30 min;
    c) subjecting a reaction product from step b) to an etherification reaction for 30 to 80 min under a normal pressure to obtain crude sodium carboxymethyl cellulose (CMC-Na), wherein the etherification reaction is carried out by the following steps:
    adding the reaction product from step b) into 2 to 10 parts by weight of a monochloroacetic acid-ethanol solution to perform the etherification reaction under normal pressure, wherein
    the monochloroacetic acid-ethanol solution contains 45% to 65% by weight of monochloroacetic acid and ≥93% by volume of ethanol;
    d) acidifying the crude CMC-Na to obtain carboxymethyl cellulose (CMC-H) by the following steps:
    adding the crude CMC-Na into a sulfuric acid solution to perform an acidizing reaction for 60 to 180 min in a normal-pressure system, wherein the sulfuric acid solution contains 10% to 40% by weight of sulfuric acid; and
    e) adding the CMC-H into a lithium salt-ethanol solution to perform a substitution reaction for 30 to 120 min under a pH of 6.5 to 10.0, thereby obtaining the lithium carboxymethyl cellulose;
    wherein the total of cellulose, the aqueous solution of a polar solvent, the sodium hydroxide solution, the ethanol solution, and the monochloroacetic acid-ethanol solution is 100 parts by weights.

* * * * *